United States Patent Office 3,554,010
Patented Jan. 12, 1971

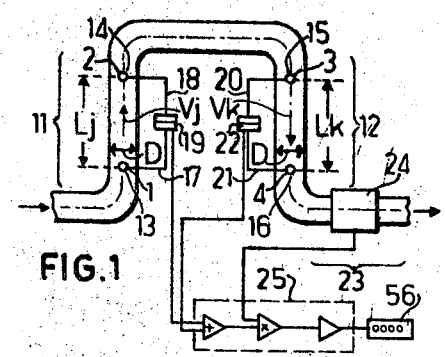

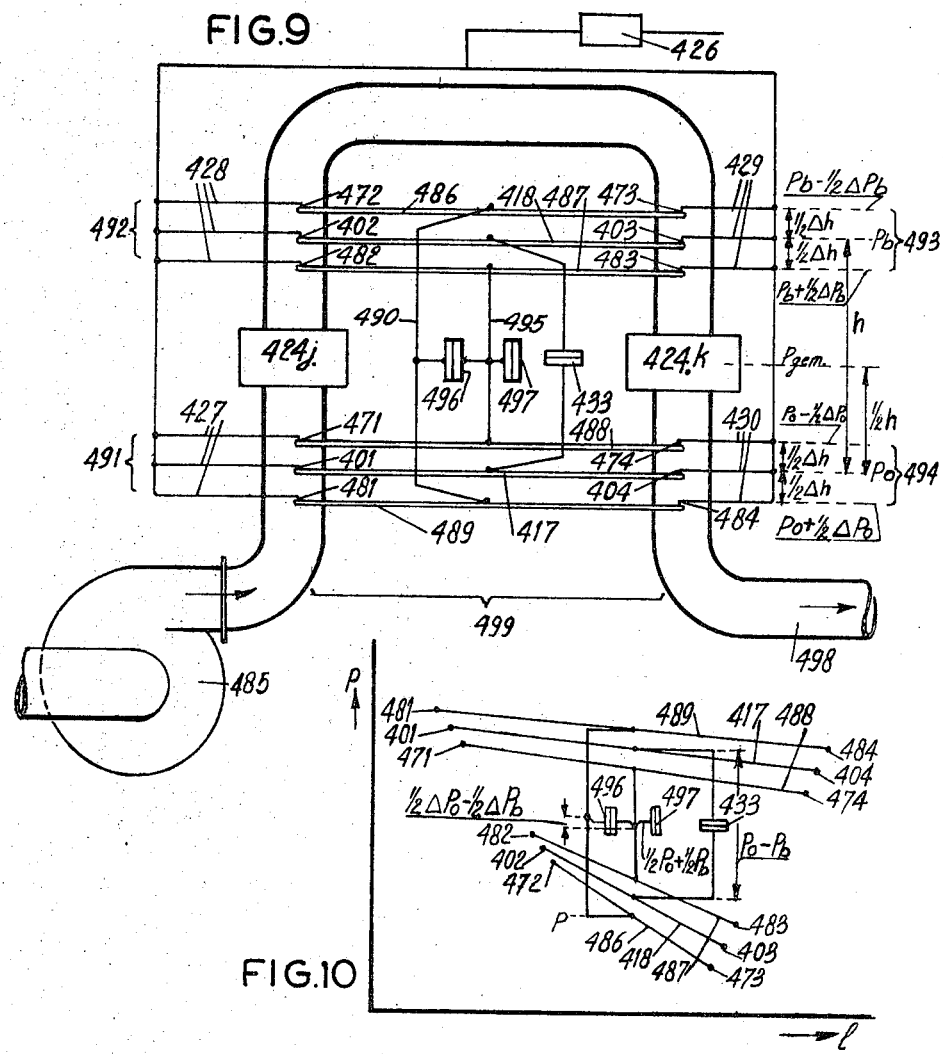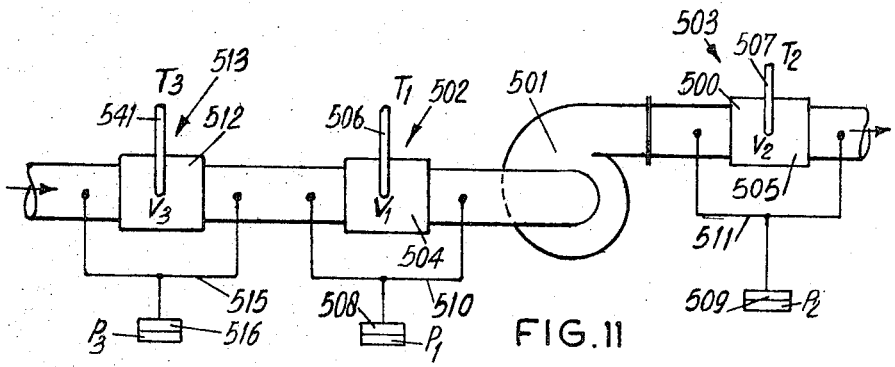

3,554,010
METHOD AND SUCTION DREDGING INSTALLATIONS FOR CONVEYING DREDGING SPOIL
Romke van der Veen, Jutphaas, and Jan de Koning, Amsterdam, Netherlands, assignors to N.V. Ingenieursbureau voor Systemen en Octrooien "Spanstaal," Rotterdam, Netherlands, a Dutch company
Filed Apr. 21, 1969, Ser. No. 817,692
Claims priority, application Netherlands, Apr. 24, 1968, 6805778
Int. Cl. G01n *15/06, 9/26*
U.S. Cl. 73—61                                    11 Claims

ABSTRACT OF THE DISCLOSURE

In a method and apparatus for measuring the quantity of a suspension of dredging spoil and water, means are provided to compensate for the presence of air in the suspension. The measure compensation is derived by taking pressure measurements of at least two flow sections in the system at which the prevailing pressures are different.

---

The present invention relates to a method and apparatus for measuring the quantity of dredging spoil or the like.

With nearly each contracted dredging- or raise-work the quantity of dug or displaced material is the basis on which the cost for the work is settled. This is mostly an amount of money agreed upon in advance based by the volume or the weight of dredging spoil. For such a settlement it is important that the convey concentration of dredging spoil in the conveyed suspension be measured accurately. A method and apparatus highly suitable for this purpose are disclosed in copending applications, Ser. Nos. 817,691 and 817,999 filed on even date herewith and assigned to the assignee of the present application.

It is further important in the pumping of a suspension of dredging spoil and water through a pipe, to know the convey concentration of dredging spoil during operation in order to be able to convey the dredging spoil in the most economic way without risk of stopping of the pipe.

The invention relates to a method for conveying a suspension of mainly dredging spoil and water through a pipe wherein a measured value dependent on the output of dredging spoil, for example the convey concentration of dredging spoil, is obtained.

With the known methods of measuring dredge spoil flow a faulty value of a faulty convey concentration is measured, when air occurs in the suspension. The invention provides an improved method wherein the measured value is compensated with a compensation value, which is related to the quantity of the air occurring in the suspension, which compensation value is derived from measurements at at least two flow sections, in which the prevailing pressures are different.

The invention also provides an improved suction dredging installation, comprising a pipe for conveying a suspension of mainly dredging spoil and water, which pipe is provided with a pick up for picking up a measured value dependent on the output of dredging spoil, wherein at least two pipe sections, at which different pressures prevail during operation, are provided with pick ups, from which the compensation value can be derived.

The mentioned and other features of the invention will be elucidated in the following description with reference to drawings in which:

FIGS. 1 and 3 schematically illustrate two systems for measuring the quantity of a suspension of dredging spoil;
FIGS. 2 and 4 are pressure diagrams illustrating the pressures at specified points of the systems of FIGS. 1 and 3, respectively;
FIGS. 5 and 7 are schematic diagrams of other systems for measuring the quantity of dredging spoil;
FIGS. 6 and 8 are pressure diagrams similar to FIGS. 2 and 4 for the systems of FIGS. 5 and 7, respectively;
FIG. 9 is a schematic diagram of a measuring system of the type of FIG. 5 modified according to the present invention;
FIG. 10 is a pressure diagram for the system of FIG. 9; and
FIG. 11 schematically illustrates a pipe for conveying a suspension of dredging spoil and water, which pipe is provided with a completely other measuring device according to the invention.

The elements corresponding with each other of the five represented embodiments are provided with the same reference numbers, on the understanding that the reference numbers of the elements of the second, third, fourth and fifth embodiment are each time increased by 100 relative to the reference numbers of the corresponding elements of the preceding embodiment.

For a good understanding of the preferred embodiment of the method and suction dredging installation according to the invention, first a number of measuring devices will be described as illustrated in the FIGS. 1–8 which will serve to facilitate the understanding of the present invention as illustrated in FIGS. 9 and 10. The embodiments of FIGS. 1–8 are also thoroughly described in said copending applications.

As is shown in FIG. 1, a measuring section is incorporated in a pipe, through which a suspension of dredging spoil and water flows, which measuring section has the shape of a reversed U with vertical legs. A pipe fraction $j$, which conveys the suspension vertically upwards and a pipe fraction $k$, which conveys the suspension vertically downwards, thus created.

For measuring the convey concentratiton of dredging spoil in the suspensions, connections 13, 14, 15 and 16 respectively are provided in the measuring section on the indicated measuring points 1, 2, 3 and 4. The connections 13 and 14 are connected by means of conduits 17 and 18 with the opposite sides of a pressure pick up 19 for picking up the difference between the pressure in the fraction $j$ at the measuring point 1 and that at the measuring point 2.

In the same way the connections 15 and 16 are connected by means of conduits 20 and 21 with the opposite sides of a pressure pickup 22 for picking up the difference between the pressure in the fraction $k$ at the measuring point 3 and that at the measuring point 4.

Further a velocity meter 24 known by itself is provided in a horizontal pipe fraction 23, which velocity meter 24 for example may work on the basis of an unhomogenous magnetic field.

The measured values of the pressure pick ups 19 and 22 are added up by means of a calculating machine 25 and multiplied by the measured value of the velocity meter 24. This product is integrated over the total flow time and registered on a counter 56.

The pressures of the measuring points and the measured pressure differences $h_j$ of the fraction $j$ and $h_k$ of the fraction $k$ are shown in FIG. 2.

For $h_j$ and $h_k$ the following equations are:

$$h_j = L_j(S_j + C_j V_j^2)$$

and $$h_k = L_k(S_k + C_k V_k^2)$$

In which the symbols represent:
$L_j$ and $L_k$ the length of the pipe between the measuring points 1 and 2 and that between the measuring points 3 and 4 respectively, $S_j$ and $S_k$ the specific gravity of the suspension in the fractions $j$ and $k$ respectively.

$V_j$ and $V_k$ the flow velocity of the suspension in the fractions $j$ and $k$ respectively and $C_j$ and $C_k$ constant values, which represent the factor of flow resistance per unit of length.

When the fractions $j$ and $k$ are identical then: $C_j = C_k$.
Equal diameters of the fractions $j$ and $k$ give: $V_j = V_k$.

$$h_j/L_j = S_j + C_j \cdot V_j^2$$
$$h_k/L_k = S_k - C_k \cdot V_k^2$$
$$h_j/L_j + h_k/L_k = S_j + S_k$$

When adding the terms $h_j/L_j$ and $h_k/L_k$ the terms relating to the flow resistances cancel out.

The percentage of the volume of dredging spoil in the suspension can be calculated from the specific gravity of the conveyed suspension, which is equal to the average of $S_j$ and $S_k$.

It is true that the dredging spoil in the fraction $j$ tends to remain behind relatively to the upward flow as a result of its larger specific gravity. This tendency, however, is compensated in the fraction $k$ by the tendency of the dredging spoil to hurry on the downward flow as a result of the mentioned larger specific gravity. The volume concentration $C_v$ of dredging spoil in the suspension can be calculated as follows:

$$\tfrac{1}{2} S_j + \tfrac{1}{2} S_k = 1 - C_v + C_v \cdot S_b$$

wherein $S_b$ is the known specific gravity of the dredging spoil without empty spaces, which for example, is equal to 2.65 kg./dm.$^3$. Then it follows from this equation:

$$1.65 C_v = (S_j + S_k - 2) \cdot 0.50$$

The weight of dredging spoil per dm.$^3$ suspension, indicated by $$G_b = 2.65 C_v = (S_j + S_k - 2) \cdot 0.805$$

Multiplication of $G_b$ by the number of litres of conveyed suspension per second, gives the production $0_b$ in weight of dredging spoil/second.

$0_b = G_b \cdot A \cdot V_s$, wherein $V_s$ represents the velocity of the suspension measured by means of the velocity meter 24 and wherein A represents the flow surface of the velocity meter 24.

By the integration of $0_b$ over the flow time the quantity of weight of dredging spoil delivered during this time is obtained.

The measuring points 2 and 3 preferably are arranged at the same level and the measuring section with the junction bends is completely symmetrical. With an interior pipe diameter of 60 cm. the vertical distance between the measuring points 1 and 2 is for example, 4 m. Adding the values $h_j/L_j$ and $h_k/L_k$ is easier, if $L_j = L_k$.

In order to prevent dredging spoil from landing in the conduits 117, 118, 120 and 121, water is pumped as a purgative into the measuring section by means of a pump 126 through four mainly identical narrow purgative conduits 127, 128, 129 and 130, which conduits are connected to the connections 101, 102, 103 and 104 respectively (see FIG. 3).

The pressure reduction in the purgative conduits is shown in FIG. 4. If the pressures in the purgative conduits are measured on a pipe length $= U_m$ from the pump 126 and the total pipe length from the pump to the connections 101, 102, 103 and 104 is equal to $U_n$, then $h_j = h_{jm} \cdot U_n/U_m$ and $h_k = h_{km} \cdot U_n/U_m$.

For increasing the measuring accuracy the measuring points on the purgative conduits 127–130 are arranged close to the connections 101–104.

The flow velocity of the suspension $S_s$ is preferably determined as shown in FIG. 3 by means of two velocity meters $124_j$ and $124_k$ instead of the single velocity meter as in the system illustrated in FIG. 1. With a velocity measurement in a horizontal fraction 23 of FIG. 1 measuring errors can arise, in that dredging spoil may deposit in this fraction, causing the flow diameter to decrease and an incorrect flow velocity to be measured. The deposit of dredging spoil is excluded in a vertical fraction. The problem occurs therewith that in an upward flow the water velocity is larger than in the downward flow, because the dredging spoil remains behind relative to the water in the first case and hurries forward relatively to the water in the second. The measuring errors possibly resulting therefrom when picking up $V_j$ and $V_k$ are compensated by taking the average of $V_j$ and $V_k$.

With the embodiment of the measuring device according to the invention, which device is shown in FIG. 5, the connections 202 and 203 are connected to each other by means of an upper conduit 218, while a tactile conduit 231 is provided between the middle 206 of upper conduit 218 and one side of a pressure pickup 233. In the same manner the connections 201 and 204 are connected to each other by means of a lower conduit 217 and a tactile conduit 232 is provided between the middle 205 of the lower conduit 217 and the other side of the pressure pickup 233. In this way only one single pressure pickup 233 measures a pressure which is equal to $\tfrac{1}{2} h_j + \tfrac{1}{2} h_k$ (see FIG. 6, so that an automatic adding and halving takes place. If a little dredging spoil should flow from the fraction $j$ into the conduits 218 and 217, this is no disadvantage, for this dredging spoil flows then through the conduits 218 and 217 respectively in to the fraction $k$. It cannot flow into the tactile conduits 231 and 232 respectively, because these conduits extend first upwards from the connecting points 206 and 205 respectively. The measurement according to FIG. 5 has besides the advantage that one less pickup and an electric adding unit is necessary, the advantage that a reduced picking up error is introduced as a result of the picking up by means of only one pressure pickup instead of by means of two pickups.

The output of the pressure difference pickup 233 is connected to the calculating machine 225, as well as to an indicator 270 for indicating the specific gravity of the conveyed suspension or for indicating the convey concentration of dredging spoil in this suspension.

The measuring device shown in FIG. 7, is not provided with purgative conduits. In that embodiment an upper conduit 318 and a lower conduit 317 connect the measuring point 302 to the measuring point 303 and the measuring point 301 to the measuring point 304 respectively. Further a pressure difference pick up 333 is incorporated between the mid-point 306 and 305 of the upper and lower conduits, respectively. The pressure pick up 333, as is shown in FIG. 8 picks up a value, which is equal to $\tfrac{1}{2} h_j + \tfrac{1}{2} h_k$. This measured value can control a control member 371 of a control device for automatically controlling the conveying process.

It is true that a negligible quantity of the suspension flows from the pipe fraction $j$ through the upper and lower conduit to the pipe fraction $k$. If necessary this quantity can be calculated.

The above-described measuring methods and systems which are also described in said copending applications are highly satisfactory, if no air or gas occurs in the suspension. However, there are working circumstances, for example during suction unloading of barges filled with dredging spoil, in which presence of air in the suspension cannot be avoided. Particularly in measuring the quantity of dredging spoil for establishing the cost for the ground-work, which quantity is conveyed through a pipe during the performance of a ground-work, it is very important that the measuring result be corrected, preferably automatically, when air or gas bubbles occur in the mixture.

In the remainder of the specification and in the claims, it is intended that reference to air is to be considered as referring to air as well as any other gas.

The presence of air in a suspension of dredging spoil and water results in the lowering of, the measured specific gravity than when no air is present in the suspension. With the above-described measuring device, as well as with other specific gravity meters, for example the specific gravity meter operating on the basis of radio-active radiation, a too low convey concentration of dredging spoil is measured as a result of the presence of air. On the other hand the measured output will be measured slightly above the proper value, when electro-magnetic velocity meters are used.

Suppose that a volume percentage of air$=C_L$ is present in a suspension of dredging spoil and water, that the specific gravity of this suspension$=\alpha$ and that the specific gravity of the suspension without air having the same proportion of dredging spoil/water$=\gamma$.

This $\gamma$ is a measure for the quantity of dredging spoil in the suspension and the aim of the convey concentration meter is to determine $\gamma$ accurately and independent of the quantity of air. This is possible with a measuring device, which measures also $C_L$. Namely, when $C_L$ is known, it is possible to calculate from $\alpha$ the $\gamma$, by the formula:

$$\alpha = \frac{\gamma(100-C_L)}{100} \quad (1)$$

$$\gamma = \frac{100}{100-C_L} \alpha \quad (2)$$

Starting from a specific gravity of dredging spoil $=2.65$ and a specific gravity of water$=1.0$ is $$\gamma = \frac{C_t \cdot 2.65 + (100-C_t) \cdot 1.0}{100} \quad (3)$$

wherein $C_t$ represents the convey concentration of dredging spoil, then:

$$\gamma = 1 - 0.0165\, C_t \quad (4)$$

According to the invention the criterion is used when determining the air percentage $C_L$, that by changing the pressure, the dredging spoil- and water volume do not noticeably change but that the air volume does change. Accordingly as the pressure is lower, the specific gravity of the dredging spoil with water and air suspension will differ more from the specific gravity of the sand with water suspension, because the percentage of air $C_L$ increases.

With the preferred method according to FIG. 9 a suspension of dredging spoil and water, in which air possibly is present, is conveyed through a pipe 498 by means of a pump 485. A measuring section 499 of the kind as is described with reference to the embodiments of FIGS. 5 and 6 is incorporated in pipe 498. Namely four pipe sections 491, 492, 493 and 494 respectively are arranged round the measuring points 401, 402, 403 and 404, which pipe sections 491, 492, 493 and 494 have each a height $\Delta h$. A pump 426 is also connected to the measuring points 401, 402, 403 and 404 as well as to the measuring points 471, 472, 473 and 474, at the upper ends to the measuring points 481, 482, 483 and 484, at the lower ends of the pipe sections 491, 492, 493 and 494 by means of purgative conduits 427, 428, 429 and 430. The purgative conduits are respectively connected to each other by means of upper conduits 486 and 488, intermediate conduits 418 and 417, and lower conduits 487 and 489 near the measuring points mounted at the same level. The mid-pionts of the upper conduit 486 and the lower conduit 489 are connected to each other by means of a first tactile conduit 490, and the mid-points of the lower conduit 487 and the upper conduit 488 are connected to each other by means of a second tactile conduit 495.

Between the mid-points of the middle conduits 417 and 418 a pressure difference pickup 433 is connected, which picks up the pressure difference $\Delta P' = P_0 - P_b$.

Between the mid-points of the two tactile conduits 490 and 495 a pressure difference pickup 496 is connected, which picks up the pressure difference equal to $$\tfrac{1}{2}\Delta P_0 - \tfrac{1}{2}\Delta P_b$$

and a pressure pickup 497 is connected to the mid-point of the tactile conduit 495, which picks up about the pressure $P_{gem} = \tfrac{1}{2}P_0 + \tfrac{1}{2}P_b$.

A velocity meter $424_j$ is mounted in the middle between the pipe sections 491 and 492 and a velocity meter $424_k$ is mounted in the middle between the pipe sections 493 and 494.

At the right hand of FIG. 9 there are notations, which indicate pressures averaged by means of upper-, middle- and lower conduits, which pressures prevail at the levels of the concerned measuring points and which occur in fact in the middles of the upper-, mid-points and lower conduits, while in FIG. 10 an example of the values of these pressures is shown, and the pressures which are picked up by means of the pressure difference pickups 433 and 496 and the pressure pickup 497 are shown.

The pressures prevailing in the lower pipe sections 491 and 494 are principally higher than those in the upper pipe sections 492 and 493, because an extra column of suspension stands on the lower pipe sections 491 and 494.

The following will show that $C_L$ can be measured with this measuring device.

Assuming that the air bubbles follow Boyle's law ($A=$constant) and that the change of temperature of the air acting in the measuring section is negligible, then it holds for the bubbles:

$$P_0 \cdot V_0 = P_b \cdot V_b = P_{gem} \cdot V_{gem} \quad (5)$$

The notation 0 means at the bottom, $b$ at the top and $gem$ in the middle, where the velocity meters $424_j$ and $424_k$ are mounted, or $$C_{L0} \cdot P_0 = C_{Lb} \cdot P_b = C_{L\,gem} \cdot P_{gem} \quad (6)$$

This can be written as an equation:

$$P_0 : P_b = C_{Lb} : C_{L0} \quad (7)$$

Owing to the law on the equation it is also held:

$$\frac{C_{Lb} + C_{L0}}{P_0 + P_b} = \frac{C_{Lb} - C_{L0}}{P_0 - P_b} \quad (8)$$

For the specific gravity to be measured of the dredging spoil with water and air suspension, at the bottom and at the top of the U-shaped measuring section 499, the follow formulas hold (1):

$$\alpha_0 = \frac{\gamma(100-C_{L0})}{100}$$

and $$\alpha_b = \frac{\gamma(100-C_{Lb})}{100}$$

$$\alpha_0 - \alpha_b = \frac{\gamma}{100}(C_{Lb} - C_{L0}) \quad (9)$$

These two specific gravities can be measured each time over a short vertical distance $\Delta h$. In the upper pipe sections 492 and 493 the pressure difference $$\Delta P_b = \Delta h \cdot \alpha_b \quad (10)$$

is measured and in the lower pipe sections 491 and 494 the pressure difference $$\Delta P_0 = \Delta h \cdot \alpha_0 \quad (11)$$

is measured.

Combination of Equations 9, 10 and 11 gives:

$$C_{Lb} - C_{L0} = \frac{100(\Delta P_0 - \Delta P_b)}{\Delta h \cdot \gamma} \quad (12)$$

By subtracting $\Delta P_0$ and $\Delta P_b$ from each other, which is achieved hydraulically by means of the tactile conduits 490 and 495 and the pressure difference pickup 496 connected between them, a measuring result is obtained, which is a direct measure for $C_{Lb} - C_{L0}$. By means of the pressure difference pickup 433 $P_0-P_b$ is measured for determining the specific gravity of the flowing suspension, as is set forth with reference to the embodiment of FIG. 5.

Finally the half sum of the absolute pressure at the bottom and at the top $½P_0+½P_b$ or the average pressure in the four pipe sections 491, 492, 493 and 494, is measured with the pressure pickup 497, which average value is equal to the pressure in the middle between the pipe sections, where the velocity meters $424_j$ and $424_k$ are mounted. The air percentage $C_{L \text{ gem}}$ between the measuring points 401, 402, 403 and 404 may be stated approximately:

$$C_{L \text{ gem}} = ½(C_{Lb}+C_{L0}) \tag{13}$$

It is possible to calculate $C_{L \text{ gem}}$ from the above-described measurements. From the combination of (13) and (8) it follows that:

$$C_{L \text{ gem}} = (C_{Lb}-C_{L0})\frac{½(P_0+P_b)}{P_0-P_b} \text{ with } (12)$$

$$C_{L \text{ gem}} = \frac{100(\Delta P_0 - \Delta P_b)}{\Delta h \cdot \gamma} \cdot \frac{P_{\text{gem}}}{\Delta P} \tag{14}$$

After substitution of Equation 14 into 2 we obtain:

$$\gamma = \frac{100 \cdot \alpha_{\text{gem}}}{100-C_{L\text{gem}}}$$

and after writing $$\alpha_{\text{gem}} = \frac{\Delta P}{h}$$

it follows that:

$$\gamma = \frac{\Delta P}{h} + \frac{\Delta P_0 - \Delta P_b}{\Delta h} \cdot \frac{P_{\text{gem}}}{\Delta P} \tag{15}$$

until now the approximation $$\gamma = \frac{\Delta P}{h}$$

was used in dredging.

This approximation is inadmissible for determining the convey concentration on the basis of which the delivered quantity of dredging spoil is paid, when much air occurs in the suspension. In the above Equation 15 one can see that the measured value $\Delta P/h$ has to be compensated with a compensation value which is equal to $$\frac{\Delta P_0 - \Delta P_b}{\Delta h} \cdot \frac{P_{\text{gem}}}{\Delta P}$$

When air is present in the mixture. As a result of measuring by means of tactile conduits completely filled with water (s.g.=1.0) the pressure difference pickup 433 picks up in fact a value, which is directly proportional to $(\gamma-1)$. In order to apply Equation 15 to this picking up the pressure difference picked up is stated to be equal to $\Delta P'$, so that the real pressure difference between the midpoints of the middle conduits 417 and 418 is equal to $(\Delta P'+h \cdot 1.0)$. Then Equation 15 can be rewritten as:

$$\gamma = \frac{\Delta P'+h}{h} + \frac{\Delta P_0 - \Delta P_b}{\Delta h} \cdot \frac{P_{\text{gem}}}{\Delta P'+h}$$

or $$\gamma - 1 = \frac{\Delta P'}{h} + \frac{\Delta P_0 - \Delta P_b}{\Delta h} \cdot \frac{P_{\text{gem}}}{\Delta P'+h} \tag{16}$$

The conveyed weight of dredging spoil per second is:

$$G_b/\text{sec.} = Q_m \cdot 2.65 C_t = Q_m \cdot \frac{2.65}{1.65}(\gamma_{\text{gem}}-1)$$

wherein $Q_m$ is the valve, which is determined by means of a velocity meter, which does not measure air, or $$G_b/\text{sec.} = 1.61 Q_m \left( \frac{\Delta P'}{h} + \frac{\Delta P_0 - \Delta P_b}{\Delta h} \cdot \frac{P_{\text{gem}}}{\Delta P'+h} \right) \tag{17}$$

By integrating this value over the convey time the delivered weight of dredging spoil is determined.

When a velocity meter measures air as well as water, it holds for a suspension of dredging spoil, water and air flowing through a pipe:

$$Q_{\text{tot.}} = Q_b + Q_w + Q_L \tag{18}$$

Where $Q_{\text{tot.}}$ represents the total output, which is measured by means of a velocity meter based upon an unhomogenous magnetic field.

$Q_b$ the output of dredging spoil,
$Q_w$ the output of water, and
$Q_L$ the output of air.

When $Q_m$ represents the output of dredging spoil and water, one can write for Equation 18

$$Q_m = \frac{(100-C_L)Q_{\text{tot.}}}{100} \tag{19}$$

Because the specific gravity of water=1.0

$$Q_b = Q_m(\gamma-1.0) \tag{20}$$

Substitution of Equations 19 and 2 in Equation 20 gives $$Q_b = Q_{\text{tot.}} \left( \alpha - 1 - \frac{C_L}{100} \right) \tag{21}$$

The measured value $(\alpha-1)$ picked up for example, by means of a conventional convey concentration meter, is compensated with a compensation value $C_L/100$ in Equation 21.

In connection with FIG. 11 a method according to the invention is described, whereby the convey concentration of the suspension of dredging spoil and water and possibly air conveyed through a pipe 500 is determined in a completely different manner.

Measurements are carried out at pipe sections 502 and 503 at both sides of a pump 501 placed in the pipe 500. The pressure in pipe section 503 is considerably higher than that in the pipe section 502.

In each of the two pipe sections 502 and 503 the following quantities are measured:

the velocities $v_1$ and $v_2$ by means of velocity meters 504 and 505, which measure dredging spoil and air as well as water,
the temperatures $T_1$ and $T_2$ by means of thermometers 506 and 507, and
the pressures $P_1$ and $P_2$ by means of pressure pick ups 508 and 509, which are connected to the mid-points of tactile conduits 510 and 511 respectively.

Moreover besides a specific gravity meter 512, based upon radio-active rays, which meter measures the specific gravity of the suspension, a thermometer 514 picking up the temperature $T_3$ and a pressure pick up 516 picking up the pressure $P_3$ on the mid-point of a tactile conduit 515 are provided in a pipe section 513 of the pipe 500.

In this situation the following equations hold:

$$\frac{V_{L1} \cdot P_1}{T_1} = \frac{V_{L2} \cdot P_2}{T_2} \tag{22}$$

$$\frac{V_{L2} \cdot P_2}{T_2} = \frac{V_{L3} \cdot P_3}{T_3} \tag{23}$$

$$A_{v1} = (V_{bw}+V_{L1}) \tag{24}$$

$$A_{v2} = (V_{bw}+V_{L2}) \tag{25}$$

Herein V is the volume, which is conveyed/sec. and A is the surface of the flow section. The notation $bw$ relates to dredging spoil with water, L to air 1 to pipe section 502
2 to pipe section 503, and
3 to pipe section 513, where the specific gravity meter 512 is mounted.
Equations 24-25 give:

$$A(v_1 - v_2) = V_{L1} - V_{L2}$$

Substituting this last expression into Equation 22 we obtain:

$$v_1 - v_2 = \frac{V_{L2}}{A} \cdot \left(\frac{P_2 \cdot T_1}{P_1 T_2}\right) - 1$$

or $$v_{L2} = (v_1 = v_2) \frac{A \cdot P_1 \cdot T_2}{P_2 T_1 - P_1 T_2} \quad (26)$$

now $V_{bw}$ can further be calculated from Equations 25 and 26

$$V_{bw} = A \cdot v_2 - (v_1 - v_2) \frac{A \cdot P_1 \cdot T_2}{P_2 T_1 - P_1 T_2} \quad (27)$$

The meter 512 measures the measured value $$\alpha_3 = \frac{\gamma(100 - C_{L3})}{100}$$

Wherein $C_{L3}$ represents a compensation value.
For pipe section 513 it further holds that $$\frac{C_{L3} \cdot P_3}{T_3} \frac{C_{L2} \cdot P_2}{T_2}$$

or $$C_{L3} = C_{L2} \cdot \frac{P_2 T_3}{T_2 P_3} \quad (29)$$

wherein:

$$C_{L2} = \frac{V_{L2}}{V_{bw} + V_{L2}} \quad (30)$$

The combination of Equations 29, 30, 26, 27 and 28 gives the value $\gamma$ to be calculated, from which, by Equation 4 the $C_t$ in the same suspension without air can be calculated.

Finally the volume output of dredging spoil/sec. is:

$$v_2 \cdot A \cdot \frac{C_t}{100} \cdot \frac{(100 - C_{L2})}{100} \quad (31)$$

By putting the measured results in a calculating machine of the type well known in the art, which results are provided with the right factors according to Equation 31 and by integrating the output over the convey time, the desired volume quantity of the conveyed dredging spoil is obtained.

What we claim is:

1. A method for conveying a flow of a suspension consisting mainly of dredging spoil and water, said method comprising the steps of obtaining a measured value signal corresponding to the amount of dredging spoil,
    deriving a compensating signal corresponding to the amount of air present in the suspension by making measurements at two spaced flow sections at which the prevailing pressures are different, and
    compensating said measured value signal with said compensating signal, thereby to obtain a more accurate value of the quantity of dredging spoil that is substantially independent of the amount of air in the suspension.

2. The method according to claim 1 wherein said compensating signal is derived from velocity measurements at said two flow sections in which the prevailing pressures are different.

3. The method according to claim 1, wherein said compensating signal is derived by making pressure measurements at said flow sections.

4. The method according to claim 3, in which said compensating signal is derived by making pressure measurements at a lower and an upper flow section flowing substantially vertically upwards, and at a lower and an upper flow section flowing substantially vertically downwards.

5. A suction dredging installation comprising a pipe for conveying a suspension consisting of mainly dredging spoil and water, said pipe comprising first sensing means for picking up a measured value signal dependent on the output of dredging spoil, first and second pipe sections in which different pressures prevail during operation, second sensing means at said first and second pipe sections for picking up a compensation signal bearing a known relation to the amount of air in said suspension, and means for operatively combining said measured value signal and said compensation signal for obtaining a compensated measuring signal.

6. The suction dredging installation according to claim 5, wherein a velocity pickup is provided in each of said first and second pipe sections in which different pressures prevail during operation.

7. The suction dredging installation according to claim 5, wherein said first sensing means comprises pressure sensing means.

8. The suction dredging installation according to claim 7, wherein said pressure sensing means are connected to a lower and an upper pipe section of a first tube fraction, which conveys the suspension substantially vertically upwards, as well as to a lower and an upper pipe section of a second pipe fraction, which conveys the suspension substantially vertically downwards.

9. The suction dredging installation according to claim 8, wherein said upper and lower pipe sections of said first and second pipe fractions are equally high and are arranged two by two at the same level, whereby the upper ends, middles and lower ends of the pipe sections arranged at the same level are connected with each other via an upper-, middle- and lower conduit respectively, and
    a first tactile conduit connecting the middle of the upper conduit of the upper pipe section with the middle of the lower conduit of the upper pipe sections with the middle of the upper conduit of the lower pipe sections, said pressure sensing means including a first pressure difference pickup for sensing the pressure difference between the middles of said two middle conduits, and a second pressure difference pickup for sensing the pressure difference between the middles of said two tactile conduits.

10. The suction dredging installation according to claim 8, wherein a velocity meter is mounted in the middle between the two pipe sections of one of said first and second pipe fractions.

11. The suction dredging installation according to claim 10, wherein said pressure sensing means includes a pressure pick up for sensing the average pressure of said pipe sections arranged at both sides of said velocity meter.

References Cited

UNITED STATES PATENTS

| | | | |
|---|---|---|---|
| 1,697,867 | 1/1929 | Haultain | 73—438 |
| 2,287,027 | 6/1942 | Cummins, Jr. | 73—438 |
| 2,768,529 | 10/1956 | Hagler, Sr. | 73—438 |
| 3,175,403 | 3/1965 | Nelson | 73—438 |
| 3,473,401 | 10/1969 | Fajans et al. | 73—438 |

FOREIGN PATENTS

| | | | |
|---|---|---|---|
| 1,083,782 | 6/1954 | France | 73—438 |

LOUIS R. PRINCE, Primary Examiner

J. W. ROSKOS, Assistant Examiner

U.S. Cl. X.R.

73—438